April 9, 1968     S. KYSER     3,376,628
RATCHET ARM PISTON RING COMPRESSOR
Filed Sept. 3, 1965     3 Sheets-Sheet 1
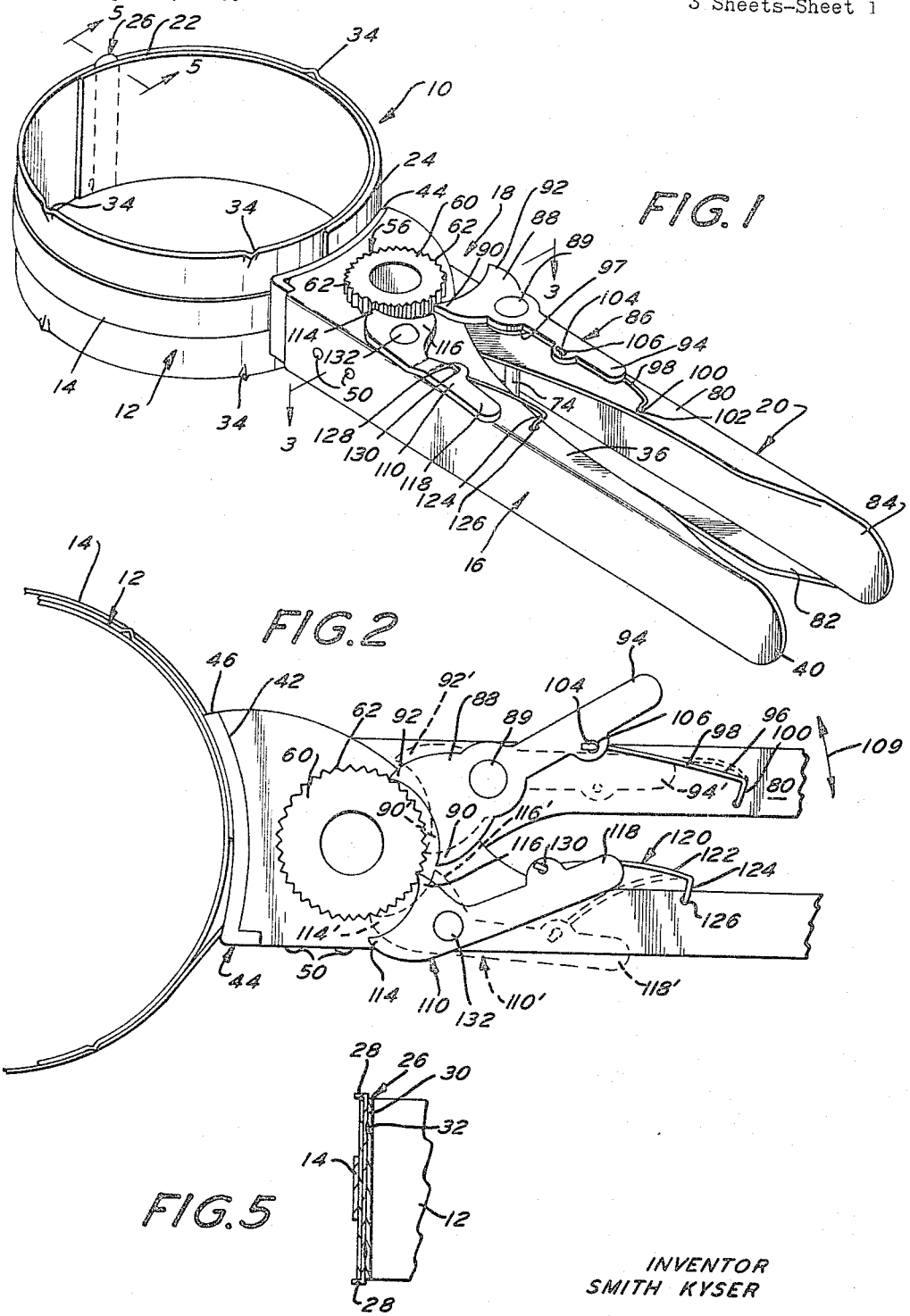
INVENTOR
SMITH KYSER
BY
Caesar, Rivise, Bernstein & Cohen
ATTORNEYS.

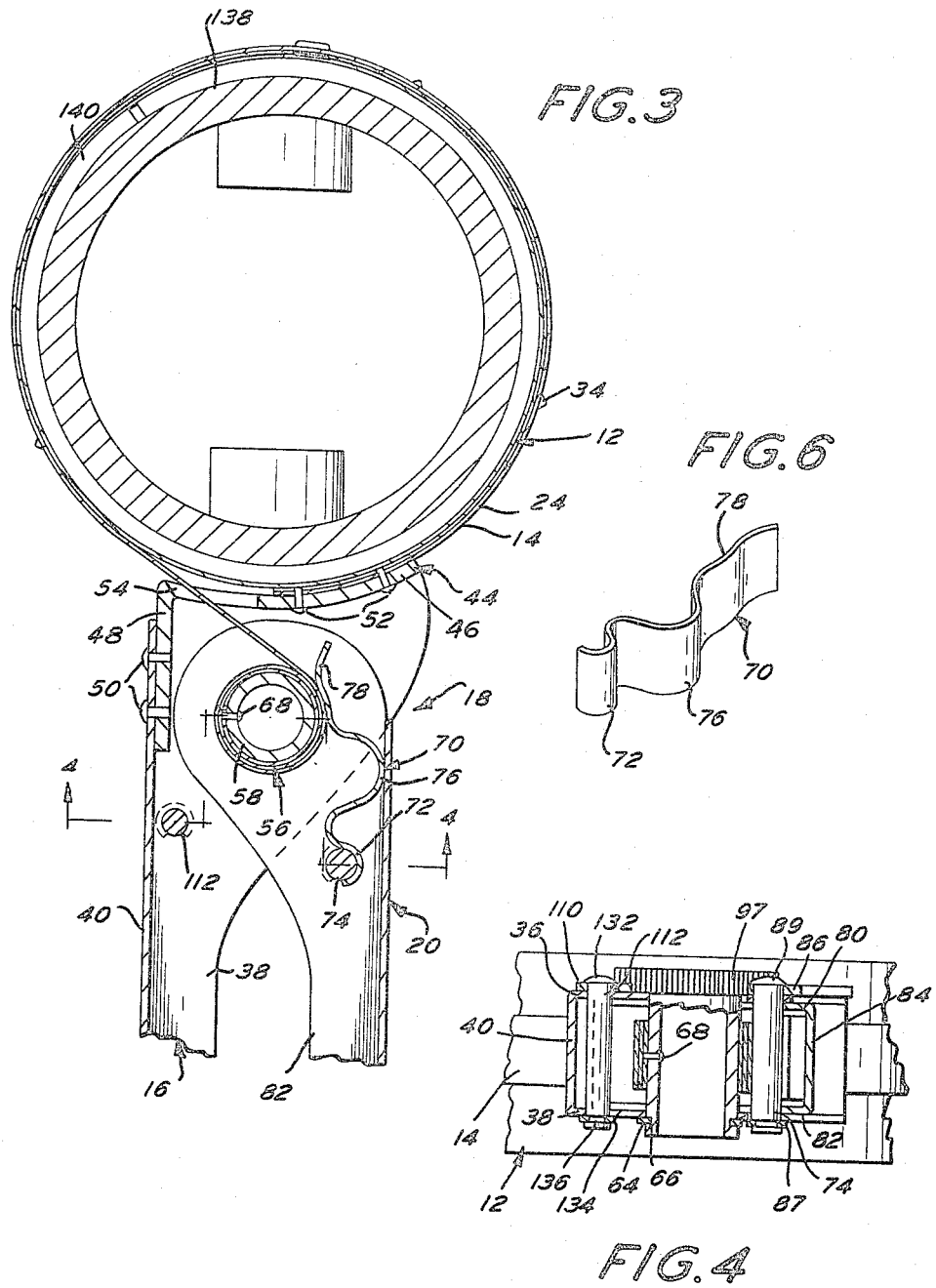

INVENTOR
SMITH KYSER

United States Patent Office 3,376,628
Patented Apr. 9, 1968

3,376,628
RATCHET ARM PISTON RING COMPRESSOR
Smith Kyser, Ionia County, Mich., assignor to Aircraft Specialties, Inc., Lapeer, Mich., a corporation of Delaware
Filed Sept. 3, 1965, Ser. No. 484,922
7 Claims. (Cl. 29—222)

ABSTRACT OF THE DISCLOSURE

A ratchet arm piston ring compressor which comprises a handle, a spring compression band having overlapping ends movable with respect to each other and a tension band associated with the handle for embracing and limiting the diameter of the compression band in accordance with the tension applied to the tension band. Adjusting means are also provided which are attached to the tension band for adjusting the diameter of the compression band and the tension on the tension band. The adjusting means includes a drum rotatably mounted in the handle for wrapping the tension band. A lever arm is also provided which is operatively connected to the drum so that said drum may be rotated in one of two selectable directions by pivoting the lever arm in said one direction. The lever arm is operatively disconnected from the drum when pivoted in the other of said directions.

---

This invention relates generally to piston ring compressors having a compression band and an associated tension band for varying the diameter of the compression band.

Existing piston ring compressors require lengthy periods of time to adjust the tension on the compression band in order to compress the rings in the grooves of a piston prior to insertion thereof in an engine block. In addition, these piston ring compressors are extremely hard to adjust, are not capable of fine adjustment on larger piston rings and often require the tension band to be snapped over the compression band for each piston.

It is, therefore, an object of this invention to provide a novel piston ring compressor.

It is another object of the invention to provide a piston ring compressor which overcomes the aforementioned disadvantages.

It is a further object of the invention to provide a rapidly adjustable piston ring compressor.

Still another object of the invention is to provide a piston ring compressor having long arms to provide leverage and thereby enable adjustment with a minimum of force.

Still another object of the invention is to provide a piston ring compressor which is rapidly adjustable yet capable of fine adjustment.

Yet another object of the invention is to provide a piston ring compressor which is capable of fine adjustment for large sizes of piston rings.

These and other objects of the invention are accomplished by providing a piston ring compressor which comprises a handle, a spring compression band having overlapping ends movable with respect to each other, a tension band associated with said handle for embracing and limiting the diameter of said compression band in accordance with the tension applied to said tension band, and adjusting means attached to said tension band for adjusting the diameter of said compression band and the tension on said tension band, said adjusting means including a drum rotatably mounted in said handle for wrapping said tension band, and a lever arm operatively connected to said drum for rotation thereof so that said diameter and tension adjustments are facilitated.

Other objects and many of the attendant advantages of this invention will be readily appreciated as the same becomes better understood by reference to the following detailed description when considered in connection with the accompanying drawing wherein:

FIG. 1 is a perspective view of a piston ring compressor embodying the present invention;

FIG. 2 is an enlarged plan view of the piston ring compressor;

FIG. 3 is an enlarged fragmentary sectional view taken on the line 3—3 of FIG. 1;

FIG. 4 is an enlarged fragmentary sectional view taken on the line 4—4 of FIG. 3;

FIG. 5 is an enlarged fragmentary sectional view taken on the line 5—5 of FIG. 1;

FIG. 6 is a perspective view of a tension clip used with the adjusting means;

Referring now in greater detail to the various figures of the drawing wherein similar reference characters refer to similar parts a piston ring compressor embodying the present invention is generally shown at 10 in FIG. 1.

Figure 7:
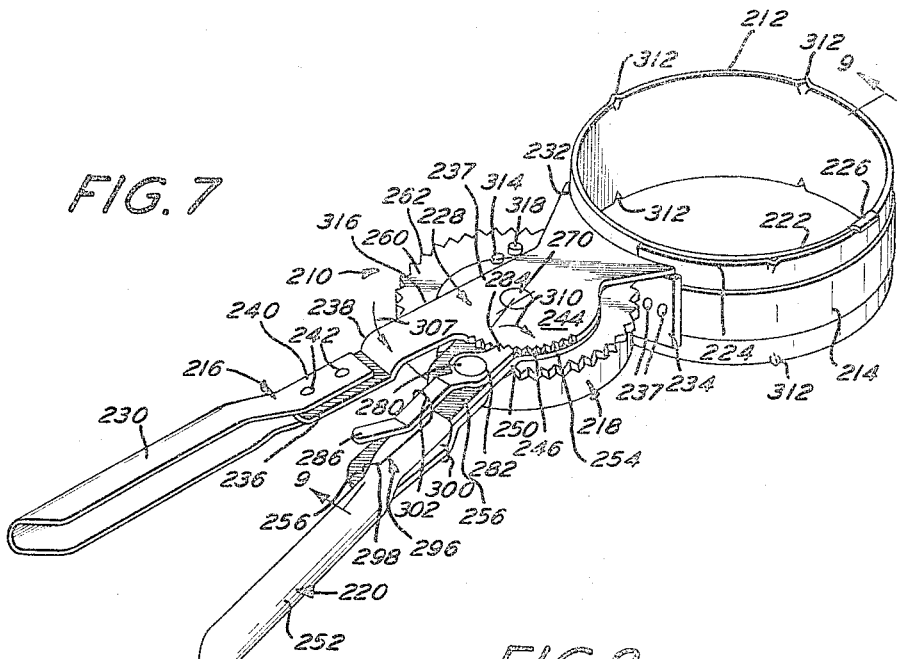
FIG. 7 is a perspective view of an alternate embodiment of a piston ring compressor embodying the invention.

Device 10 basically comprises a compression band 12, a tension band 14, a handle 16, and an adjusting means 18 which includes lever arm 20.

Compression band 12 is comprised of spring steel and is wrapped cylindrically so that ends 22 and 24 overlap. Ends 22 and 24 are movable with respect to each other and the more they overlap the smaller the diameter of the compression band 12.

The ends are vertically aligned with respect to each other by means of aligning bracket 26. Aligning bracket 26 is best shown in FIG. 5 and comprises legs 28 and a bridging section 30 which is secured to end 22 of compression band 12. The bridging section is preferably secured to the end 22 as at 32 by welding.

End 24 rides over the bridging section 30 and is constricted against vertical movement with respect to end 22 by legs 28.

Outstruck portions 34 are provided along the upper edge and lower edge of the compression band 12 to prevent the compression band from following the piston into the cylinder when the piston is pushed therein. The normal tendency of the compression band 12 is to open up and straighten out. The function of the tension band 14 is to limit the diameter of the compression band.

Tension band 14 comprises thin, flexible steel and is connected between the adjusting means 18 and the handle 16. The diameter of the compression band 12 is adjusted by varying the length of the tension band 14 by means of the adjusting means 18. Thus, the diameter of the compression band 12 is varied in accordance with the amount of tension applied to the tension band 14. Thus, as the tension band 16 is shortened the amount of the tension is increased and the diameter of the compression band 12 is decreased.

Handle 16 cradles the adjusting means 18 and lever arm 20 and generally comprises a planar extended top plate 36, a similar bottom plate 38 and an integral elongated planar bridging section 40 (FIG. 4). Plates 36 and 38 are parallel to each other and have an arcuate forward edge 42. Mounted in a position adjacent the forward edge 42 is a saddle 44. As best seen in FIG. 2, saddle 44 comprises an arcuate section 46 and an integral planar flange 48 which is preferably secured by rivets 50 to the bridging section 40 of the handle 16.

The arcuate section 46 abuts the leading edge 42 of the handle 16 and is adapted to accommodate the curvature of the compression band 12 and tension band 14. As best seen in FIG. 3, a first end of tension band 14 and end 24 of compression band 12 are secured by rivets 52 to the arcuate section 46 adjacent the end of saddle 44.

The arcuate section 46 further includes an opening 54 which enables tension band 14 to pass through the saddle to adjusting means 18 as best seen in FIG. 3.

Adjusting means 18 is mounted in the handle 16 and comprises in addition to lever arm 20, a ratchet assembly 56. The ratchet assembly 56 comprises a hollow tube or drum 58 which extends between and through top and bottom plates 36 and 38. A ratchet wheel 60 having peripheral teeth 62 is press fitted to the top of tube 58. The tube 58 is maintained in place by a split spring collar 64 which is engaged in an annular groove 66 in the outer surface of tube 58 adjacent the end thereof. The outer diameter of the spring collar 64 is larger than the opening in plate 58 and thereby prevents the lower end of tube 58 from sliding through the opening.

Tube 58 is secured to the other end of tension band 12 by a rivet 68. The end of tension band 12 is thus wrapped about the tube 58 and is taken up or let out by rotation of the tube 58. A spring clip 70 is provided to prevent the unraveling of the coil formed about the tube 58.

Spring clip 70 is comprised of thin, flexible steel and includes a first generally U-shaped section 72 which embraces pin 74. It also includes a second U-shaped section 76, a web of which bears against the inner surface of lever arm 20, and an arcuately disposed leg 78 which bears against the circumference of the coil about tube 58. The pressure applied by leg 78 against the coil about tube 58 prevents unraveling when the tension on band 14 is loosened. Thus, the diameter of the tension band 12 can be expanded when the ratchet assembly 56 is rotated counterclockwise.

Lever arm 20 is pivotally secured to handle 16 about tube 58. As best seen in FIG. 1, the arm 20 comprises a top plate 80 which is substantially planar, a substantially similar bottom plate 82 and an integral planar bridging section 84. The plates 80 and 82 are substantially parallel to each other and perpendicular to the bridging section 84 and each has a circular opening at its leading end which is aligned with respect to each other and is telescoped over the tube 58. The upper surface of top plate 80 is adjacent and bears against the lower surface of top plate 36 of handle 16 and the lower surface of bottom plate 82 is adjacent to and bears against the upper surface of bottom plate 38 of the handle.

The lever arm 20 is operatively connected to the ratchet assembly 56 by a pawl 86 which engages ratchet teeth 62. Pawl 86 is pivotally secured to lever arm 20 about pin 74.

Pin 74 passes transversely through the top and bottom plates 80 and 82 of lever arm 20. It is maintained in place by a split spring collar 87 which is engaged in an annular groove adjacent the lower end of the pin and an enlarged head 89, the bottom of which bears against the pawl 86. Pawl 86 is spaced from the top plate 80 by an annular spacer or collar 97.

Collar 97 is telescoped over the pin 74 and is maintained in place between pawl 86 and the top plate. It enables pawl 86 to engage the ratchet wheel 60 and clear the surface of top plate 36 of handle 16.

The pawl 86 comprises a head section 88 which includes a pair of fingers 90 and 92. It further includes a lever arm 94. Fingers 90 and 92 may be selectively urged against the ratchet teeth 62 by a spring 96 which is connected to lever arm 94 and top plate 80 of lever arm 20. The spring 96 has an arcuate body section 98, a U-shaped end section 100 which passes through opening 102 in top plate 80. At the other end of the spring 96 is an L-shaped end section 104 which passes through opening 106 in lever arm 94 and bears against the top surface thereof.

The natural tendency of spring 96 is to straighten out and to have the ends 100 and 104 separated more than they are shown in FIGS. 1 and 2. Thus, when lever arm 94 is rotated to the position where finger 92 bears against teeth 62 as shown in full line in FIG. 2, the spring 96 urges the pawl to stay in that position. When the pawl is rotated to the position where finger 90 bears against the teeth 62 as shown in phantom in FIG. 2, the spring 96 urges the pawl to remain in that position.

When finger 90 is in the position bearing against teeth 62, the back and forth (clockwise and counterclockwise) rotation as indicated by arrow 109 in FIG. 2 of lever arm 20 results in a clockwise movement of the ratchet assembly 56. That is, rotation in the counterclockwise direction does not impart any force to the ratchet assembly because finger 90 rides over the teeth 62. However, the rotation of lever arm 20 in a clockwise direction results in the finger 90 engaging teeth 62 and imparting a clockwise torque to the assembly 56. Conversely, when the finger 92 bears against the ratchet teeth 62, a back and forth motion of the lever arm 20 in a counterclockwise and clockwise position, respectively, results in a counterclockwise rotation of the ratchet assembly 56. Thus, the position of the pawl 86 selectively determines the direction of the motion imparted to lever arm 20 which results in either a tightening or loosening of the tension band 14 and consequent variance of the diameter of the compression band 12.

A pawl 110 is pivotally mounted to handle 16 about pin 112 adjacent the upper surface of plate 36. Pawl 110 comprises a head section having a pair of fingers 114 and 116 which are selectively engageable in teeth 62 of ratchet wheel 60 and a lever arm 118 which is connected to handle 16 by a spring 120. Spring 120 comprises an arcuate body section 122, an integral U-shaped end 124 which passes through an opening 126 in plate 36 and an integral L-shaped end 128 which passes through opening 130 in lever arm 118.

The normal tendency of spring 120 is to assume a straighter position than that shown in FIGS. 1, 2 and 3. That is, the ends tend to be more separated. Thus, when the pawl 110 is in the position shown in solid lines in FIG. 2, the spring urges the pawl 110 so that finger 116 engages the teeth 62 of ratchet wheel 60 thereby maintaining the pawl in this position. When the pawl 110 is rotated to the position shown in dotted lines in FIG. 2, the spring 120 maintains the pawl in the position with finger 114 urged into engagement with teeth 62.

Pawl 110 is normally placed in a position similar to that of pawl 86 with respect to the ratchet wheel 60. That is, if pawl 86 has finger 92 engaging the teeth 62, pawl 110 would have finger 116 engaging teeth 62. Similarly, when finger 90 engages the teeth so does finger 114. In this manner, the rotation of the ratchet assembly by lever arm 20 via pawl 86 is not impeded by the pawl 110 and in fact pawl 110 prevents the ratchet assembly from rotation in a reverse direction. Therefore, slipping is prevented.

Pin 112 passes through the plates 36 and 38 as well as pawl 110. It is maintained in place by an enlarged head 132, the bottom of which abuts the top surface of pawl 110. It is prevented against upward movement with respect to the handle 16 by a split spring 134 which is engaged in an annular groove 136 adjacent the bottom of the pin.

In operation, the compression band 12 is initially opened to a large diameter. It is telescoped over a piston 138 having piston rings 140 engaged in its annular grooves.

The pawls 86 and 110 are selectively positioned so that their fingers 90 and 114, respectively, engage the teeth 62. Therefore, back and forth movement of lever arm 20 results in the clockwise movement of the drum 58 of the ratchet assembly 56. The rotation of ratchet assembly 56 in the clockwise direction causes the tension band 14 to wrap around drum 58 and the consequent reduction in the diameter of compression band 12. The reduction of the diameter of compression band 12 causes the rings 140 to be passed into the annular grooves of piston 138.

When the rings 140 have been sufficiently compressed, the piston 138 is pushed into the cylinder of an engine block. The outstruck portions 34 prevent the compression band from following the piston into the cylinder, thus freeing the piston from ring compressor 10.

Pawls 86 and 110 are then positioned as shown in solid lines in FIG. 2 so that their fingers 92 and 116, respectively, are engaged in teeth 62 of the ratchet wheel 60. Back and forth pivoting of the lever arm 20 results in counterclockwise rotation of the ratchet assembly 56 which in turn loosens the tension band 14.

Thus, there has been shown a ratchet arm piston ring compressor which is rapidly adjustable, easy to operate and which accommodates a large range of sizes. The lever arm 20 need only be moved back and forth in order to adjust the diameter of the compression band. The same motion may also be used to finely adjust the exact diameter and tension which is suitable to compress the rings of the piston. Also, because the lever arm and handle are long with respect to the diameter of the coil about tube 58, little force is required to compress the rings.

Figure 8:
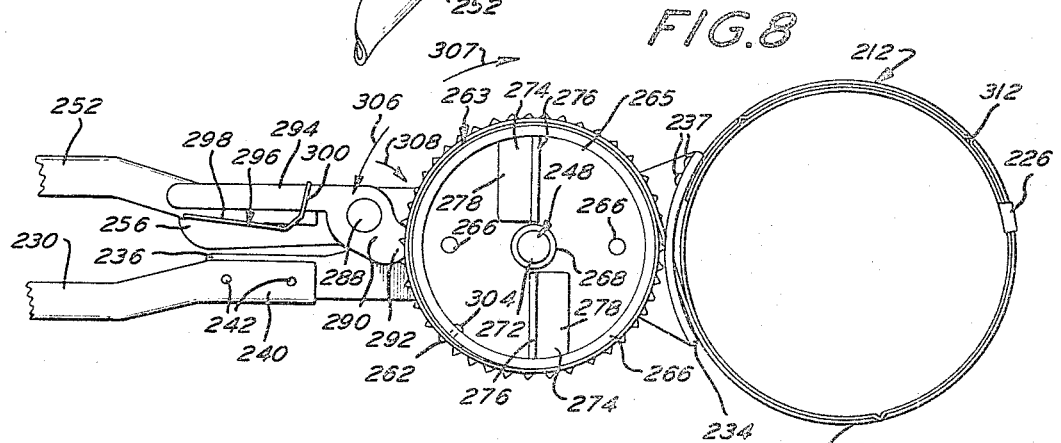
FIG. 8 is a bottom plan view of the alternate piston ring compressor.
Figure 9:
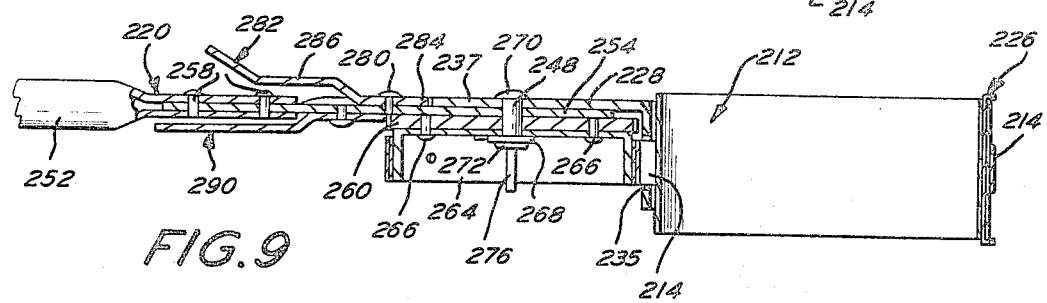
FIG. 9 is an enlarged fragmentary sectional view taken on the line 9—9 of FIG. 7.

An alternate piston ring compressor 210 embodying the invention is shown in FIGS. 7 to 9. The device 210 generally comprises a compression band 212, a tension band 214, a handle 216 and an adjusting means 218 which includes lever arm 220.

Compression band 212 is similar to compression band 12 and includes overlapping ends 222 and 224 which are kept in vertical alignment by aligning bracket 226.

Tension band 214 is wrapped around and embraces the compression band to limit its diameter in accordance with the tension applied thereto.

The handle 216 comprises a head section 228 and a gripping section 230. The head section 228 has an arcuate leading edge 232. An arcuately shaped saddle 234 having a similar curvature as the leading edge 232 of head section 228 is welded to the head section so that edge 232 is flush or even with the inner surface of the saddle 234. The saddle further includes an opening 235 (FIG. 9) which is centrally located and is adapted to pass the tension band 214.

An end of the tension band 214 is secured with end 224 to the saddle by rivets 237.

Head section 228 of handle 216 is planar and includes a planar flange 236 which is parallel to the major portion 237 of the head section and is connected thereto by an inclined integral section 238. The planes in which the bottom surfaces of the major portion 237 of the head section 228 and the flange 236 are disposed and separated by approximately the thickness of the head section.

The gripping section is comprised of an elongated U-shaped member which is tapered at its forwardmost end 240. The gripping section is preferably secured to the head section by rivets 242 which pass through the forwardmost end 240 and flange 236.

Major portion 237 of head section 228 includes a semicircular portion 244 which includes peripheral teeth 246. The adjusting means 218 is mounted in handle 216 and includes lever arm 220. Lever arm 220 is pivotally secured to handle 216 about a pin 248 which passes through the center of the semi-circular portion 244. Lever arm 220 is basically comprised of a head section 250 and a gripping section 252. Head section 250 has a circular portion 254 which is substantially concentric with the semi-circular portion 244 of head section 228 of handle 216.

That is, the circular peripheries of each are concentrically aligned with respect to each other.

The head section 250 also includes a radially extending planar flange 256. The gripping section 252 of lever arm 220 is comprised of an elongated U-shaped member which is tapered at its forwardmost end. It is secured to the flange 256 by rivets 258 as seen in FIG. 9.

A ratchet wheel 260 is mounted concentrically upon the circular portion 254 of head section 250. It is secured to the circular portion by rivets 266 (FIG. 9).

A drum 263 having a cylindrical wall 264 and a planar circular base 265 is concentrically secured to ratchet wheel 260 by rivets 266. Pin 248 passes through the centers of circular portion 254, ratchet wheel 260 and base 265. A washer 268 is telescoped over pin 248 and the bottom portion of the pin is hammered or peened flat at 272 which maintains pin 248 in place in combination with its enlarged head 270 (FIG. 9). A pair of elongated L-shaped grips 274 is secured to the base 265, preferably by welding. The grips 274 are mounted diametrically opposite each other about the pin 248. The upstanding portions 276 of the grips 274 lie along the diameter of the drum 263 and the bottom portions 278 are welded to the base portion 265 and extend in opposite directions from the upstanding portions.

Pivotally mounted to the top surface of lever arm 220 about pin 280 is a pawl 282. Pawl 282 comprises a finger 284 and a lever arm 286. Pivotally secured to the bottom surface of lever arm 220 about pin 288 is another pawl 290. Pawl 290 comprises a finger 292, which is adapted to engage teeth 262 of ratchet wheel 260, and a lever arm 294. A spring 296 is suitably mounted on the lever arm 220 to urge the pawls 282 and 290 against the corresponding teeth.

Spring 296 is basically comprised of a U-shaped body portion 298, the web of which is secured between flange 256 and gripping section 252 of the lever arm 220, and U-shaped loops 300 and 302 at each end, which are substantially transverse to the legs of body section 298. U-shaped loop 300 encompasses the lever arm 294 of pawl 290. The loop 302 encompasses the lever arm 286 of pawl 282. The natural tendency of the spring 296 is to have the legs of the body section 298 separate angularly about the web of the body section. Thus, a force is imparted to both pawls 282 and 290 which urges the fingers 284 and 292, respectively, into the teeth of the corresponding ratchet teeth 246 and 262. The purpose of these pawls will appear hereinafter.

A rivet 304 secures an end of the tension band 214 to the cylindrical wall 264 of drum 263 as shown in FIG. 8. The tension band is thus wrapped around the cylindrical wall as a coil. Tension may be increased in the tension band 214 by turning the drum 263 in the direction of arrow 306. Conversely, the tension may be released by rotation in the opposite direction.

The drum may be rotated by insertion of the operator's fingers behind the upstanding portions 276 of the finger grips 274 and rotating the drum in the direction of arrow 306. The drum may also be rotated by drawing together the handle 216 and the lever arm 220. Pawl 282 and pawl 290 prevent rotation of the drum in the opposite direction when they are engaged in teeth 246 and 262, respectively.

As best seen in FIG. 7, a cylindrical stop 314 is secured to the upper surface of circular portion 254 of head section 250. The stop 314 limits the separation between handle 216 and the lever arm 220. That is, as lever arm 220 is rotated away from handle 216, the stop 314 is rotated towards the flat lateral edge 316 of the head section 228 of the handle 216. Thus, the amount of rotation of the lever arm 220 with respect to the handle 210 is limited by stop 314 when it abuts the edge 316.

A cylindrical stop 318 is secured to the top surface of the ratchet wheel 260. Stop 318 limits the expansion of the compression band 212 when the pawl 290 has freed the drum 263. That is, when pawl 290 is rotated in the direction of arrow 308, the ratchet wheel 260 is freed for rotation with drum 263. As the wheel and drum assembly rotate in the direction of arrow 307, the cylindrical stop approaches and abuts the lateral edge of flange 256 of the head section 250 of the lever arm 220 which faces the flange 236. This stops the rotation of drum 263 and the expansion of tension band 214. Thus stops 314 and 318 provide a limit of the extent to which the compression band 214 can be expanded.

In operation, by rotation of pawl 290 in the direction of arrow 308, the drum 263 is released for rotation. The tension from tension band 214 by the spring of compression band 212 causes the drum 263 to rotate in the direction of arrow 307 thereby enabling the diameter of the tension band to increase. This in turn enables the compression band to increase in diameter.

When the pawl 290 is manually released it is returned into engagement with teeth 262 by the urging of spring 296. Next, pawl 282 is rotated in the direction indicated by arrow 310. This releases lever arm 220 which is drawn farther apart with respect to handle 216 by the remaining tension on tension band 214. The rotation of the arm 220 away from handle 216 is limited by the cylindrical stop 314. In this position the compression band 212 is open to its largest diameter.

Compression band 212 is then placed over the piston 138 in a manner similar to that shown in FIG. 3 with respect to the device 10.

The drum 263 is rotated in the direction indicated by arrow 306 as far as possible by the manual rotation of grips 274. The operator then draws together the lever arm 220 and handle 216 to further shorten the diameter of the compression band 212 which thereby substantially compresses the rings 140 in the annular grooves provided in the outer surface of the piston 138. The piston is then pushed through the compression band 212 into the cylinder of an engine block. The compression band does not follow due to the outstruck portions 312 which are provided at the upper and lower peripheries of the compression band 212. By manually rotating the pawls 282 and 290 to their unlocked position, the compression band is opened fully and a new piston may be operated on.

Thus, a rapidly adjusting piston ring compressor has been shown. Adjustment is extremely fine as well as quick due to lengthy lever arms which provide a maximum amount of control while maintaining simplicity.

Obviously many modifications and variations of the present invention are possible in the light of the above teachings. It is, therefore, to be understood that within the scope of the appended claims, the invention may be practiced otherwise than as specifically described.

What is claimed as the invention is:

1. A ratchet arm piston ring compressor comprising a handle, a spring compression band having overlapping ends movable with respect to each other, a tension band associated with said handle for embracing and limiting the diameter of said compression band in accordance with the tension applied to said tension band, and adjusting means attached to said tension band for adjusting the diameter of said compression band and the tension on said tension band, said adjusting means including a drum rotatably mounted in said handle for wrapping said tension band, and a pivotable lever arm operatively connected to said drum so that said drum being rotatable in one of two selectable directions by pivoting said lever arm in one of said directions, said lever arm being operatively connected from said drum when pivoted counter to one of said directions.

2. A ratchet arm piston ring compressor comprising a handle, a spring compression band having overlapping ends movable with respect to each other, a tension band associated with said handle for embracing the limiting the diameter of said compression band in accordance with the tension applied to said tension band, and adjusting means attached to said tension band for adjusting the diameter of said compression band and the tension on said tension band, said adjusting means including a drum rotatably mounted in said handle for wrapping said tension band, said drum including a ratchet wheel, and a rotatable lever arm being operatively connected to said drum so that said diameter and tension adjustments are facilitated, said lever arm including a pawl, said pawl having a finger which engages said ratchet wheel for tightening so that said tension band may be tightened by rotation of said lever arm.

3. A ratchet arm piston ring compressor comprising a handle, a spring compression band having overlapping ends movable with respect to each other, a tension band associated with said handle for embracing and limiting the diameter of said compression band in accordance with the tension applied to said tension band, and adjusting means attached to said tension band for adjusting the diameter of said compression band and the tension on said tension band, said adjusting means including a drum rotatably mounted in said handle for wrapping said tension band, and a lever arm operatively connected to said drum so that said diameter and tension adjustments are facilitated, said lever arm including a pair of pawls rotatably mounted on opposite sides of said arm, said handle having a circular portion which includes peripheral teeth, said drum being mounted on a ratchet wheel having peripheral teeth, said pawls being spring urged so that the fingers of said pawls each engage in a corresponding set of teeth so that the diameter of said compression band cannot be increased inadvertently.

4. A ratchet arm piston ring compressor comprising a handle, a spring compression band having overlapping ends movable with respect to each other, a tension band associated with said handle for embracing and limiting the diameter of said compression band in accordance with the tension applied to said tension band, and adjusting means attached to said tension band for adjusting the diameter of said compression band and the tension on said tension band, said adjusting means including a drum rotatably mounted in said handle for wrapping said tension band, a ratchet wheel mounted on said drum, and a rotatably mounted lever arm, said arm including a pawl having a pair of fingers which is rotatably mounted thereon, said fingers of said pawl being selectively engageable in said ratchet wheel so that back and forth rotation of said lever arm results in selective increasing or decreasing of the diameter of said compression band.

5. The invention of claim 4 and further including a second pawl which is rotatable on said handle, said fingers of said second pawl being selectively engageable in the teeth of said ratchet wheel so that the diameter of said compression band may be maintained.

6. The invention of claim 5 and further including a first spring for said pawl mounted on said lever arm and a second spring for said second pawl, said springs being adapted to maintain the respective fingers of said pawls in their selective engagement with said ratchet wheel.

7. The invention of claim 1 and further including a saddle secured to said handle, said saddle having an opening for passing said tension band, and said tension band and said compression band being secured at an end of said saddle.

References Cited

UNITED STATES PATENTS

| | | | |
|---|---|---|---|
| 1,347,764 | 7/1920 | Shirley | 81—64 X |
| 1,910,729 | 5/1933 | Wheat | 29—222 |
| 1,594,318 | 7/1926 | Morriston | 29—222 |
| 1,821,356 | 9/1931 | Newton | 29—222 |
| 3,174,215 | 3/1965 | Huigens et al. | 29—222 |

OTHELL M. SIMPSON, *Primary Examiner.*

WILLIAM FELDMAN, *Examiner.*

J. C. PETERS, *Assistant Examiner.*